Header omitted 3,271,338
POLYVINYL HALIDE STABILIZERS COMPRISING SULFUR-CONTAINING COMPOUNDS AND METAL SALTS OF EPOXIDIZED FATTY ACIDS
Peter Klemchuk, Yorktown Heights, and Martin Dexter, White Plains, N.Y., assignors to Geigy Chemical Corporation, Greenburgh, N.Y., a corporation of Delaware
No Drawing. Filed Nov. 27, 1961, Ser. No. 155,191
17 Claims. (Cl. 260—23)

The invention relates to the stabilization of polymers of vinyl chloride by means of stabilizer systems comprising two elements:

(1) A complex containing a metal carboxylate, and either an epoxy moiety in said metal carboxylate or a separate epoxy compound, and (2) A metal organic compound containing sulfur.

More particularly, the synergistic stabilizer system for protecting polymer compositions of vinyl chloride against thermal and/or light induced degradation comprises:

(1) Either (a) a metal salt of an aliphatic carboxylic acid having at least one epoxy ring therein—preferably said acid containing from 8 to 18 carbon atoms—said metal being preferably a divalent metal, e.g. cadmium, calcium, barium, or zinc, most preferably cadmium or (b) a mixture of (i) a metal salt of an aliphatic carboxylic acid—preferably having from 8 to 18 carbon atoms—said metal being preferably Cd, Ca, Ba, Zn, and (ii) an epoxy containing compound—preferably an organic carboxylic acid ester, especially having from 8 to 36 carbon atoms, and (2) A metal organic compound containing sulfur which may be either of the following:

(a) A salt of the formula:

$$\left[ R-S-CH_2-\underset{R'}{\underset{|}{C}H}-COO- \right]_2 M \qquad I(a)$$

wherein

R may be a primary alkyl group—preferably of 8 to 17 carbon atoms—or a monoalkylphenyl group—preferably having 7 to 15 carbon atoms, e.g. methylphenyl ethylphenyl, propylphenyl, butylphenyl, pentylphenyl, hexylphenyl, etc. preferably the p-tertiary butylphenyl group and nonylphenyl—or the phenyl group, R' may be hydrogen or lower alkyl, e.g. methyl, preferably hydrogen, and M may be a divalent metal, e.g. cadmium, calcium, barium, or zinc, preferably cadmium, or (b) A metal mercaptide of the formula:

$$[Q-S-]_2 M \qquad I(b)$$

wherein

Q may be a primary alkyl group having 12 to 18 carbon atoms or alkylphenyl, and

M is defined as hereabove, or (c) A 2-alkylthiosuccinate salt of the formula:

$$\begin{array}{c} T-S-CH-CO \\ | \phantom{T-S-CH-} \diagdown \\ \phantom{T-S-CH-CO} O \\ \phantom{T-S-CH-CO O} \diagdown M \\ \phantom{T-S-CH-CO O} \diagup \\ \phantom{T-S-CH-CO} O \\ | \phantom{T-S-CH-} \diagup \\ CH_2-CO \end{array} \qquad I(c)$$

wherein

T is a primary alkyl group having 12 to 18 carbon atoms, preferably n-dodecyl, and M is defined as hereinabove.

Some of the compounds of the Formula I(a)—while not as useful when employed separately as stabilizers—nevertheless have never been specifically described in combination with polyvinyl chloride compositions. The novel compounds of the Formula II are thus useful stabilizers:

$$\left[ Z-S-CH_2-\underset{R'}{\underset{|}{C}H}-COO- \right]_2 M \qquad II$$

wherein

Z represents a monoalkylphenyl group, as further defined in Formula I(a) hereinabove, and R' and M also are as defined in the same Formula I(a).

The free acids corresponding to Formula II are useful intermediates in preparing the stabilizers of the invention.

Polymeric material containing polymers of vinyl chloride finds use in a great variety of shaped articles, films, filaments, etc. It is of importance to find the optimum stabilization system for the protection of such items of polymeric material, not only during the fabrication and forming of such articles where temperatures of at least 150° C. are frequently employed, but also at lower temperatures which will be experienced during ordinary use. Exposure to light is another cause of degradation which is checked with the synergistic combination of stabilizers according to the invention.

Although the protection of polyvinyl chloride polymers is illustrative of the invention, the same is not limited to stabilization of pure polyvinyl chloride but extends to the stabilization of polymers of mixtures of vinyl chloride and other monomers, as well as to polymers of other halogen containing monomers.

While it is true that some of the individual elements of the synergistic combination of stabilizers have been used in the past to stabilize polyvinyl chloride, the specific combinations herein disclosed have not been described before, nor have the extremely good results of the present stabilizer system been realized up to this time.

Some of the individual stabilizer elements are known compounds which are either available commercially or are easily prepared according to known methods. The propionic acid derivatives are prepared by conventional methods such as the reaction of an alkylthiophenol with an ester of acrylic acid in the presence of a suitable catalyst, such as a base catalyst like a quaternary ammonium compound or a tertiary alkoxide, etc.

The following examples are illustrative of the invention, but it is not the intention to limit the same thereto. In the examples, parts are by weight, unless otherwise indicated and the relationship of parts by weight to parts by volume is as that of grams to cubic centimeters. Unless otherwise specified, temperatures are in degrees centigrade.

EXAMPLE I

*Preparation of 3-(p-tert.butylphenylthio)propionic acid*

33.26 parts of p-t-butylthiophenol are mixed with 18.08 parts of methyl acrylate in a round-bottom flask. Then, 4 drops of benzyltrimethylammonium methoxide solution (40% in methanol) caused an exothermic reaction with the temperature rising to 110° when added to the reaction mixture. The reaction heat is checked by means of a cold water bath and the reaction mixture is stirred as it cools to room temperature, after which the ester is hydrolyzed in one half hour by heating and stirring on the steam bath with a solution of 12.80 parts of sodium hydroxide in 40 parts by volume of water. The resultant mixture is then cooled and diluted with 100 parts by volume of water and made acid with 103 parts by volume of 3 N hydrochloric acid, whereupon the product 3-(p-tert.butylphenylthio)propionic acid which precipitates is kept on ice, then filtered, washed with water until chloride free and dried. The yield of dry material is 39.6 parts and the product melts at 94–94.5°.

EXAMPLE II

*Preparation of cadmium 3-(p-tert.butylphenylthio) propionate*

An aqueous solution of the sodium salt of 3-(p-tert.-butylphenylthio)propionic acid is prepared by the addition of 19 parts by volume of 1.05 N sodium hydroxide solution to 4.77 parts of the free acid in 100 parts by volume of water. The resultant solution is mixed with 2.67 parts of cadmium acetate dihydrate (dropwise addition of a solution of the dihydrate in 25 parts by volume of water), whereupon the product cadmium 3-(p-tert.-butylphenylthio)propionate precipitates as a soft, noncrystalline material which is then filtered, washed with water, dried on the funnel and then slurried in ether and refiltered. The product is obtained in a yield of 5.14 parts having an analysis for cadmium of 18.13% (theory: 19.15%).

EXAMPLE III

*Preparation of barium 3-(p-tert.butylphenylthio)-propionate*

In a similar manner to the method described in Example II for the cadmium salt, the barium salt is prepared using 2.44 parts of barium chloride dihydrate in place of the cadmium acetate. The gummy precipitate which forms is set aside to harden before being filtered to yield the product salt barium 3-(p-tert.butylphenylthio) propionate in quantity of 4.82 parts with an analysis of 20.74% barium (theory: 22.45%).

EXAMPLE IV

*Preparation of calcium 3-(p-tert.butylphenylthio)-propionate*

In a similar manner to the method described in Example II for the cadmium salt, the calcium salt is prepared using 1.11 parts of calcium chloride in place of the cadmium acetate. The product is ether washed to yield 4.26 parts of calcium 3-(p-tert.butylphenylthio)propionate having an analysis of 7.51% calcium (theory: 7.79%).

EXAMPLE V

*Preparation of zinc 3-(p-tert.butylphenylthio)propionate*

In a similar manner to the method described in Example II for the cadmium salt, the zinc salt is prepared using 2.20 parts of zinc acetate dihydrate in 15 parts by volume of water. The precipitate which forms is filtered, washed with water and dried in yield 10.7 parts with analysis for zinc of 11.95% (theory: 12.11%).

EXAMPLE VI

*Stabilized polyvinyl chloride*

A sample of stabilized resin is prepared by milling for 10 minutes at 165° 100 parts of polyvinyl chloride resin (QYSM–5, Bakelite), 2 parts of cadmium 3-n-dodecylthiopropionate, the so stabilized resin being protected against thermal instability as evidenced by tests in the forced draft oven at measured intervals and constant temperature of 160°. The stabilized resin is compared to a blank for development of color due to thermal instability and rated according to the Gardner Color Scale. The following Table (I) shows the results of tests with the foregoing stabilizer and also with other individual stabilizers used in the stabilizer systems according to the invention.

TABLE I

[Compositions of polyvinyl chloride resin with single stabilizer: Results of tests for thermal stability at 160° over 2 hour period]

| Stabilizer | Gardner Color at Intervals (mins.) | | | |
|---|---|---|---|---|
| | 0 | 30 | 60 | 120 |
| Unstabilized PVC Resin | 1 | 4 | 8 | 13 |
| Cadmium n-dodecylmercaptide | 2 | 4 | 7 | 8 |
| Cadmium n-Octadecylmercaptide | 1 | 3 | 5 | 6 |
| Cadmium 3-n-dodecylthiopropionate | 0 | 0 | 1 | 3 |
| Cadmium 3-(dodecylthio)-2-methylpropionate | 0 | 1 | 4 | Black |
| Cadmium 3-(phenylthio)propionate | 0 | 1 | 2 | 3 |
| Cadmium 2-n-dodecylthiosuccinate | 1 | 3 | 7 | 8 |
| Barium 3-(p-tert.butylphenylthio)-propionate | 1 | 3 | 7 | 12 |
| Cadmium 3-(p-tert.butylphenylthio)propionate | 0 | 0 | 1 | 2 |
| Calcium 3-(p-tert.butylphenylthio)propionate | 1 | 3 | 8 | 14 |

EXAMPLE VII

*Synergistic stabilization of polyvinyl chloride at 160°*

A sample of stabilized resin is prepared in the same manner as described in Example VI, except that the stabilizer system is different as illustrated by the results in Table II hereinbelow. In the Table II, each individual stabilizer was used in a concentration of 1 part per hundred parts of unstabilized resin.

TABLE II

[Compositions of polyvinyl chloride resin with synergistic systems: Results of tests for thermal stability at 160° over 2 hour period]

| Stabilizer System | Gardner Color at Intervals (mins.) | | | |
|---|---|---|---|---|
| | 0 | 30 | 60 | 120 |
| (A) Cadmium 3-n-dodecylthiopropionate and cadmium 10,11-epoxyundecanoate | 0 | 0 | 1 | 2 |
| (B) Cadmium 3-dodecylthiopropionate and cadmium 9,10-epoxystearate | 0 | 0 | 1 | 2 |
| (C) Cadmium 3-dodecylthio-2-methylpropionate and cadmium 9,10-epoxystearate | 0 | 0 | 0 | 2 |
| (D) Cadmium 3-phenylthiopropionate and cadmium 9,10-epoxystearate | 0 | 1 | 1 | 2 |
| (E) Cadmium 2-dodecylthiosuccinate and cadmium 9,10-epoxystearate | 0 | 0 | 1 | 2 |
| (F) Barium 3-(p-tert.butylphenylthio)propionate and cadmium 9,10-epoxystearate | 0 | 0 | 0 | 1 |
| (G) Cadmium 3-(p-tert.butylphenylthio)-propionate and cadmium 9,10-epoxystearate | 0 | 0 | 0 | 1 |
| (H) Calcium 3-(p-tert.butylphenylthio)propionate and cadmium 9,10-epoxystearate | 0 | 0 | 1 | 3 |
| (I) Calcium 3-(p-tert.butylphenylthio)propionate and calcium 9,10-epoxystearate | 1 | 3 | 5 | 13 |
| (J) Calcium 3-(p-tert.butylphenylthio)propionate and zinc 10,11-epoxyundecanoate | 0 | 0 | 0 | 3 |

Similar samples of stabilized resin are prepared in the manner of Example VII, i.e. instead of 2 parts per hundred of unstabilized polyvinyl chloride for a single stabilizer, 1 part per hundred each of 2 distinct stabilizers is employed to form a synergistic stabilizer system. Table III shows the results of testing these systems.

TABLE III

[Compositions of polyvinyl chloride resin with synergistic systems: Results of tests for thermal stability at 160° over 2 hour period]

| Stabilizer System | Gardner Color at Intervals (mins.) | | | |
|---|---|---|---|---|
| | 0 | 30 | 60 | 120 |
| (K) Cadmium octadecylmercaptide and cadmium 9,10-epoxystearate | 0 | 1 | 1 | 3 |
| (L) Cadmium dodecyl mercaptide and cadmium 10,11-eposyundecanoate | 0 | 1 | 2 | 3 |
| (M) Cadmium dodecyl mercaptide and cadmium 9,10-epoxystearate | 0 | 1 | 1 | 3 |
| (N) Cadmium dodecyl mercaptide and cadmium 9,10-12,13-diepoxystearate | 0 | 1 | 1 | 2 |
| (O) Cadmium p-t-butylphenyl mercaptide and cadmium 9,10-epoxystearate | 0 | 0 | 0 | 2 |
| (P) Cadmium p-t-nonylphenyl mercaptide and cadmium 9,10-epoxystearate | 0 | 0 | 1 | 2 |
| (Q) Barium p-t-butylphenyl mercaptide and cadmium 9,10-epoxystearate | 0 | 0 | 1 | 2 |
| (R) Cadmium p-t-butylphenyl mercaptide and barium 9,10-epoxystearate | 0 | 0 | 1 | 2 |
| (S) Cadmium undecanoate epoxide 201 and cadmium dodecyl Mercaptide | 0 | 1 | 1 | 2 |

NOTE.—(S) is an example in which a commercial epoxide is added in an amount sufficient to provide the same number of equivalents of eposide which have been provided if cadmium epoxyundecanoate had been used. In such a case, the metal salt is that of the desired saturated organic carboxylic acid, e.g. undecanoic acid here. In (S), 1.1 parts Epoxide 201 are added in addition to the other two additives.

When the color values for samples containing a single stabilizer are compared with the values for the synergistic combination of stabilizers, there is observed the fact that in every combination, the color value of the stabilized resin is *lower* than the color value of an equivalent quantity of either of the single stabilizers alone. This is not the expected result of a combination of stabilizers. For example, having reference to the following table (IV), as well as to the foregoing Tables I, II, and III it is seen how in stabilizer system G (Table II), after 120 minutes in the oven at 160°, very little thermal degradation of the polyvinyl chloride has been effected since the Gardner Color rating is only 1, a change of only 1 rating point from the original rating of 0 (colorless). After the same interval of time, one component, cadmium 3-(p-tert.butylphenylthio)propionate, has a Gardner Color rating of 2 when employed at the same concentration as the synergistic combination system. Moreover, the other component, cadmium 9,10-epoxystearate, when employed alone at the same concentration as the synergistic system G, has a Gardner Color rating of 6. Thus, it would be expected that a combination of these two stabilizers would produce a Gardner Color rating between 2 and 6. Actually, the rating is much better than the expected average value of about 4; the actual rating is 1, an excellent rating for thermal stability. By a similar comparison of the data, it is seen that the other stabilizer combinations illustrated are synergistic in effect. Table IV following helps to make this clear.

TABLE IV

[Compositions of polyvinyl chloride resin with single stabilizer: Results of tests for thermal stability at 160° over 2 hour period]

| Stabilizer System | Gardner Color at Intervals (Mins.) | | | |
|---|---|---|---|---|
| | 0 | 30 | 60 | 120 |
| Cadmium 10,11-epoxyundecanoate | 0 | 3 | 5 | 7 |
| Cadmium 9,10-epoxystearate | 0 | 2 | 2 | 6 |
| Cadmium 9,10-epoxy-12-hydroxy-stearate | 1 | 3 | 4 | 5 |
| Cadmium 9,10-12,13-diepoxystearate | 0 | 3 | 3 | 6 |
| Zinc 10,11-epoxyundecanoate | 0 | 1 | 3 | Black |
| Calcium 9,10-epoxystearate | 0 | 5 | 16 | 18 |
| Zinc 9,10-epoxystearate | 0 | 1 | Black | |

EXAMPLE VIII

*Synergistic stabilization of polyvinyl chloride at 180°*

Samples of stabilized resin are prepared in the manner described in Example VI above, except that some variations in the amounts of stabilizer elements are made due to the fact that different systems are compared. The following Table V illustrates the operation of the combination of epoxide and metal salt in place of metal epoxycarboxylate which latter is seen from the foregoing Example VII.

TABLE V

[Compositions of polyvinyl chloride resin with multiple stabilizer: Results of tests for thermal stability at 180° over 1 hour period]

| Stabilizer System | Parts/100 | Gardner Color at Intervals (mins.) | | | | |
|---|---|---|---|---|---|---|
| | | 0 | 15 | 30 | 45 | 60 |
| (i) Cadmium 3-(p-t-butylphenyl-thio) propionate | 1 | 0 | 0 | 1 | 1 | 2 |
| Cadmium 9,10 expoxystearate | 1 | | | | | |
| (ii) Cadmium 3-(p-t-butylphenyl-thio) propionate | 1 | 0 | 1 | 1 | 2 | 3 |
| Cadmium stearate | 1 | | | | | |
| Expoxide 201 also known as 3,4-epoxy-6-methylcyclohexylmethyl-3,4-epoxy-6-methylcyclohexanecarboxylate | 0.4 | | | | | |
| (iii) Cadmium 3-(p-t-butylphenyl-thio) propionate | 1 | 1 | 1 | 2 | 2 | 3 |
| Cadmium Stearate | 1 | | | | | |
| Expoxidized soy bean oil (Plastoflex ESO) | 1 | | | | | |
| (iv) Cadmium 3-(p-t-butylphenyl-thio) propionate | 1 | 0 | 0 | 1 | 2 | 3 |
| Cadmium stearate | 1 | | | | | |
| Octyl epoxystearate | 1 | | | | | |
| (v) Cadmium 3-(p-t-butylphenyl-thio) propionate | 2 | 0 | 1 | 2 | 18 | (¹) |

¹ Black.

What is claimed is:

1. Composition of matter which comprises a major proportion of polyvinyl chloride and a minor proportion of a stabilizer system comprising in a ratio of substantially 1:1 by weight:
   (1) a member selected from the group consisting of
      (a) a metal salt of an aliphatic carboxylic acid having at least one epoxy ring therein, said carboxylic acid containing from 8 to 18 carbon atoms and said metal being selected from the group consisting of cadmium, calcium, barium and zinc, and
      (b) a mixture of
         (i) a metal salt of an aliphatic carboxylic acid having from 8 to 18 carbon atoms, said metal being selected from the group consisting of cadmium, calcium, barium and zinc, and
         (ii) an organic carboxylic acid ester having from 8 to 36 carbon atoms and at least one epoxy group therein and
   (2) a compound of the formula:

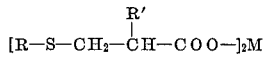

wherein
R is a member selected from the group consisting of primary alkyl having from 8 to 18 carbon atoms, monoalkylphenyl and phenyl
R' is a member selected from the group consisting of hydrogen and lower alkyl, and
M is a member selected from the group consisting of cadmium, calcium, barium and zinc.

2. Composition of matter which comprises a major proportion of polyvinyl chloride and a minor proportion of a stabilizer system comprising in a ratio of substantially 1:1 by weight cadmium 3-n-dodecylthiopropionate and cadmium 10,11-epoxyundecanoate.

3. Composition of matter which comprises a major proportion of polyvinyl chloride and a minor proportion of a stabilizer system comprising in a ratio of substantially 1:1 by weight cadmium 3-n-dodecylthiopropionate and cadmium 9,10-epoxystearate.

4. Composition of matter which comprises a major proportion of polyvinyl chloride and a minor proportion of a stabilizer system comprising in a ratio of substantially 1:1 by weight cadmium 3-(dodecylthio)-2-methylpropionate and cadmium 9,10-epoxystearate.

5. Composition of matter which comprises a major proportion of polyvinyl chloride and a minor proportion of a stabilizer system comprising in a ratio of substantially 1:1 by weight cadmium 3-phenylthiopropionate and cadmium 9,10-epoxystearate.

6. Composition of matter which comprises a major proportion of polyvinyl chloride and a minor proportion of a stabilizer system comprising in a ratio of substantially 1:1 by weight cadmium 2-dodecylthiosuccinate and cadmium 9,10-epoxystearate.

7. Composition of matter which comprises a major proportion of polyvinyl chloride and a minor proportion of a stabilizer system comprising in a ratio of substantially 1:1 by weight barium 3-(p-tert.butylphenylthio)propionate and cadmium 9,10-epoxystearate.

8. Composition of matter which comprises a major proportion of polyvinyl chloride and a minor proportion of a stabilizer system comprising in a ratio of substantially 1:1 by weight cadmium 3-(p-tert.butylphenylthio)propionate and cadmium 9,10-epoxystearate.

9. Composition of matter which comprises a major proportion of polyvinyl chloride and a minor proportion of a stabilizer system comprising in a ratio of substantially 1:1 by weight calcium 3-(p-tert.butylphenylthio)propionate and cadmium 9,10-epoxystearate.

10. Composition of matter which comprises a major proportion of polyvinyl chloride and a minor proportion of a stabilizer system comprising in a ratio of substantially 1:1 by weight calcium 3-(p-tert.butylphenylthio)propionate and calcium 9,10-epoxystearate.

11. Composition of matter which comprises a major proportion of polyvinyl chloride and a minor proportion of a stabilizer system comprising in a ratio of substantially 1:1 by weight calcium 3-(p-tert.butylphenylthio)propionate and zinc 10,11-epoxyundecanoate.

12. Composition of matter which comprises a major proportion of polyvinyl chloride and a minor proportion of a stabilizer system comprising in a ratio of substantially 1:1 by weight cadmium octadecylmercaptide and cadmium 9,10-epoxystearate.

13. Composition of matter which comprises a major proportion of polyvinyl chloride and a minor proportion of a stabilizer system comprising in a ratio of substantially 1:1 by weight cadmium dodecylmercaptide and cadmium 10,11-epoxyundecanoate.

14. Composition of matter which comprises a major proportion of polyvinyl chloride and a minor proportion of a stabilizer system comprising in a ratio of substantially 1:1 by weight cadmium dodecylmercaptide and cadmium 10,11-epoxyundecanoate.

15. Composition of matter which comprises a major proportion of polyvinyl chloride and a minor proportion of a stabilizer system comprising in a ratio of substantially 1:1 by weight cadmium dodecylmercaptide and cadmium 9,10-12,13-diepoxystearate.

16. Composition of matter which comprises a major proportion of polyvinyl chloride and a minor proportion of a stabilizer system comprising in a ratio of substantially 1:1 by weight cadmium p-t-nonylphenyl mercaptide and cadmium 9,10-epoxystearate.

17. Composition of matter which comprises a major proportion of polyvinyl chloride and a minor proportion of a stabilizer system comprising in a ratio of substantially 1:1 by weight cadmium p-t-butylphenyl mercaptide and cadmium 9,10-epoxystearate.

References Cited by the Examiner

UNITED STATES PATENTS

| | | | |
|---|---|---|---|
| 2,564,646 | 8/1951 | Leistner et al. | 260—23 X |
| 2,581,915 | 1/1952 | Radcliffe | 260—45.75 |
| 2,590,059 | 3/1952 | Winkler | 260—45.75 |
| 2,671,064 | 3/1954 | Cowell et al. | 260—45.75 |
| 2,680,107 | 6/1954 | Leistner et al. | 260—45.75 |
| 2,684,353 | 7/1954 | Greenspan et al. | 260—23 |
| 2,684,956 | 7/1954 | Weinberg et al. | 260—31.8 |
| 2,723,965 | 11/1955 | Leistner et al. | 260—45.75 |
| 2,872,458 | 2/1959 | Wagner | 260—516 |
| 2,877,261 | 3/1959 | Hardy et al. | 260—516 |
| 2,935,491 | 5/1960 | Mack | 260—45.75 |
| 2,954,362 | 9/1960 | Wilson | 260—45.75 |
| 2,954,363 | 9/1960 | Kuehne et al. | 260—45.75 |
| 3,004,949 | 10/1961 | Chevassus | 260—45.75 |
| 3,067,166 | 12/1962 | Zaremsky | 260—45.75 |
| 3,136,740 | 6/1964 | Klemchuk et al. | 260—45.75 |

LEON J. BERCOVITZ, *Primary Examiner.*

J. W. BEHRINGER, R. A. WHITE,
*Assistant Examiners.*

UNITED STATES PATENT OFFICE
CERTIFICATE OF CORRECTION

Patent No. 3,271,338                      September 6, 1966

Peter Klemchuk et al.

It is hereby certified that error appears in the above numbered patent requiring correction and that the said Letters Patent should read as corrected below.

Column 8, line 7, for "10,11-epoxyundecanoate" read -- 9',10-epoxystearate --.

Signed and sealed this 1st day of August 1967.

(SEAL)
Attest:

EDWARD M. FLETCHER, JR.            EDWARD J. BRENNER
Attesting Officer                      Commissioner of Patents